United States Patent [19]

Kobayashi

[11] 4,214,306

[45] Jul. 22, 1980

[54] ELECTRONIC FUEL INJECTION CONTROL APPARATUS

[75] Inventor: Akio Kobayashi, Kariya, Japan

[73] Assignee: Nippondenso Co., Ltd., Kariya, Japan

[21] Appl. No.: 907,054

[22] Filed: May 17, 1978

[30] Foreign Application Priority Data

May 31, 1977 [JP] Japan .................................. 52-64068

[51] Int. Cl.[2] .......................... F02D 5/00; G06F 15/20

[52] U.S. Cl. .................................... 364/431; 123/480; 123/492; 123/493

[58] Field of Search ........................ 364/424, 425, 431; 123/117 D, 117 R, 32 EA, 32 EF, 32 EG, 32 EH, 32 EL

[56] References Cited

U.S. PATENT DOCUMENTS

| | | | |
|---|---|---|---|
| 3,906,207 | 9/1975 | Rivere et al. | 364/425 |
| 3,969,614 | 7/1976 | Moyer et al. | 123/32 EA |
| 4,051,818 | 10/1977 | Völckers | 123/32 EA |
| 4,099,495 | 7/1978 | Kiencke et al. | 364/424 |

*Primary Examiner*—Felix D. Gruber

*Attorney, Agent, or Firm*—Cushman, Darby & Cushman

[57] ABSTRACT

An electronic fuel injection control apparatus for an internal combustion engine mounted on an automotive vehicle. In a vehicle system where the amount of fuel injected to the engine is electronically calculated from the rotation speed and the amount of sucked air at every rotation of the engine, the operating condition of the engine is monitored and discriminated as to whether the monitored operating condition is in a predetermined operating range where the surge of the automotive vehicle is apt to occur due to the resonance between the change in the output torque of the engine and the vehicle mechanical structure. The amount of fuel is calculated from the currently measured value of the amount of sucked air and the currently measured value of the rotation speed in response to the discrimination result indicating little potential for the occurrence of surge, whereas it is calculated from the currently measured value of the amount of sucked air and a corrected value of the rotation speed in response to the discrimination result indicating high potential for the occurrence of surge. The corrected value of the rotation speed is calculated from the currently measured value of the rotation speed so that the corrected value changes less from the precedingly measured value of the rotation speed than the currently measured value of the rotation speed.

5 Claims, 3 Drawing Figures

ELECTRONIC FUEL INJECTION CONTROL APPARATUS

BACKGROUND OF THE INVENTION

The present invention relates to an electronic fuel injection apparatus for supplying an internal combustion engine with fuel intermittently.

It is known well in the art related to an automotive vehicle that an internal combustion engine is supplied with fuel intermittently by an electronic fuel injection control apparatus which calculates the required amount of fuel electronically from the measured values of the operating parameters of the engine. The electronic fuel injection control apparatus typically calculates the required amount of fuel in proportion to the amount of air sucked into the engine and in inverse proportion to the rotation speed of the output shaft of the engine at every rotation thereof. It is therefore a great advantage of this type of electronic fuel injection control apparatus that the mixture ratio of air and fuel supplied to the engine can be kept substantially at a desired constant value and that the amount of fuel supplied to the engine can be modulated within a short period of time after a change in the operation of the engine. It is a further advantage that, since the electronic fuel injection control apparatus prevents fuel from being supplied to the engine during the deceleration of the engine, fuel economy is enhanced.

Contrary to these advantages, when the engine is decelerated with the throttle valve thereof being closed or accelerated from a low rotation speed, the automotive vehicle is apt to be subjected to a periodic surge, a vibratory back-and-forth motion, which deteriorates the vehicle driveability. While the automotive vehicle is subjected to the surge, it is observed that the rotation speed of the engine changes greatly at a frequency which is one-fourth of the rotation speed in timed relation with the surge with both the amount of sucked air and the intake pressure of the engine remaining unchanged.

The periodic surge is analysed to result from a resonance between the change in the output torque of the engine and the mechanical structure of the vehicle. When the throttle valve is closed to decelerate the engine, for example, fuel supply to the engine is prevented to decrease the output torque or the rotation speed of the engine and is resumed thereafter to increase the output torque or the rotation speed of the engine. At the transition from the prevention to the resumption of the fuel supply, an accelerating force exerts abruptly on the vehicle in response to the increase in the output torque of the engine. This abrupt acceleration causes a back-and-forth vibration in the mechanical structure of the vehicle. This mechanical vibration starts to damp in proportion to the lapse of time. However, since the amount of fuel is calculated in inverse proportion to the rotation speed of the engine, the amount of fuel supplied to the engine increases and decreases in response to the decrease and increase in the rotation speed of the engine, respectively. Further, since the engine performs intake, compression, power and exhaust strokes sequentially to rotate the output shaft twice in the case of a four-stroke cycle type, there is a time delay corresponding to one rotation of the engine from the supply of air-fuel mixture in the intake stroke to the generation of the output torque in the power stroke. Provided that the increase and decrease in the output torque of the engine resulting from the increase and decrease in the rotation speed happen to be in timed relation with respective forward and backward vibrating motions of the vehicle at the one-fourth frequency of the rotation speed, it is noted that the rich and lean air-fuel mixtures are supplied to said engine in the intake stroke in which the vehicle is subjected to the backward and forward motions respectively, and therefore the output torque of the engine is increased and decreased in the power stroke in which the vehicle is subjected to the forward and backward motions respectively. Therefore the back-and-forth motion of the vehicle is not damped any more but makes a resonance with the change in the output torque of the engine.

It is effective as a countermeasure to design the electronic fuel injection control apparatus to calculate the amount of fuel such that the basic mixture ratio of air and fuel supplied to the engine becomes richer than the stoichiometric ratio. This is advantageous to prevent the surge of the vehicle, since the change in the mixture ratio relative to the basic rich mixture ratio is small enough to decrease the change in the output torque or the rotation speed of the engine. However setting the rich mixture ratio is not advantageous from the standpoint of fuel economy.

It is more desirable as an alternative countermeasure to decrease the change in the mixture ratio relative to the change in the rotation speed of the engine with the basic mixture ratio being predetermined at or leaner than the stoichiometric ratio.

SUMMARY OF THE INVENTION

It is therefore a primary object of this invention to provide an electronic fuel injection control method capable of preventing the surge of an automotive vehicle.

It is a further object of this invention to provide an electronic fuel injection control method improved to calculate the amount of fuel in inverse proportion to the rotation speed corrected from the measured rotation speed of an engine in a predetermined engine operating range in which the surge of an automotive vehicle is likely to occur.

DETAILED DESCRIPTION OF THE PREFERRED EMBODIMENTS

Figure 1:
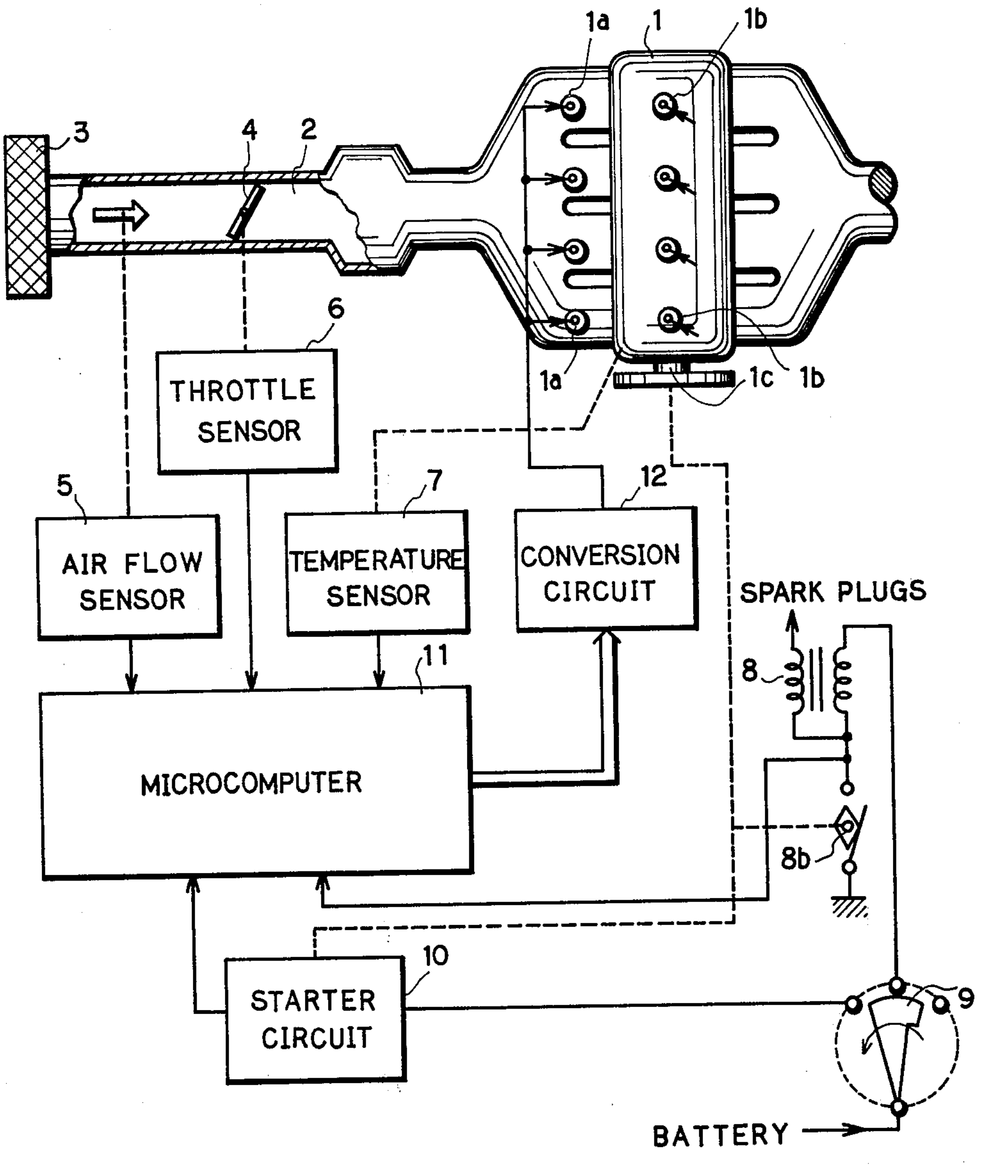
FIG. 1 is a schematic diagram illustrating an electronic fuel injection control apparatus for performing the control method according to this invention.

There is illustrated in FIG. 1 an electronic fuel injection control apparatus for performing the control method according to the present invention in association with an internal combustion engine 1. The internal combustion engine 1 mounted on an automotive vehicle (not shown) is four-stroke cycle type and has four cylinders and an output shaft 1*c*. Electromagnetically operated fuel injectors 1*a* are provided on respective intake manifolds of the engine 1 for injecting pressurized fuel (not shown) which is mixed with air sucked from an air cleaner 3 through a throttle valve 4 positioned in an intake pipe 2. The throttle valve 4 is optionally rotated by a vehicle operator. Spark plugs 1b are provided for respective cylinders of the engine 1 for igniting the combustible air-fuel mixture. The output shaft 1c is rotated by the combustion of the air-fuel mixture to produce output torque. The output shaft 1c is coupled with the breaker assembly 8b of an ignition coil 8 the primary coil and the secondary coil of which are operatively connected to a key switch 9 and the spark plugs 1b, respectively. The key switch 9 connected to a storage battery in a conventional manner is connectable to a starter circuit 10 which includes a starter motor (not shown) engageable with the output shaft 1c for cranking the engine 1.

An air flow sensor 5, or means for generating an intake signal, is provided at the upstream portion of the throttle valve 4 to detect the amount of air sucked into the engine 1 and produce a corresponding intake signal related to this particular intake parameter. A throttle sensor 6 is provided to detect the opening angle of the throttle valve 4 and produce a corresponding output signal. A temperature sensor 7 is provided to detect the temperature of the engine coolant and produce a corresponding output signal. A microcomputer 11 is connected to the sensors 5, 6 and 7 to receive the output signals indicative of the amount of sucked air, the throttle opening angle and the coolant temperature. The microcomputer 11 is connected to the ignition coil 8 to receive an output signal pulsated in synchronism with the ON-OFF operation of the breaker assembly 8b which determines the ignition timing. Thus breaker assembly 86 may be considered to be means for generating a speed signal related to the rotational velocity of output shaft 1c. Since the breaker assembly 8b is operated by the output shaft 1c, the frequency of the output signal applied to the microcomputer 11 is substantially proportional to the rotation speed of the output shaft 1c. The microcomputer 11 is further connected to the starter circuit 10 to receive an output signal indicative of the engine cranking. It should be noted herein that the microcomputer 11 is preliminarily programed to perform various operations. The microcomputer 11 is programed, as described hereinunder, to calculate the required amount of fuel using the input signals indicative of the operating conditions of the engine 1. A conversion circuit 12 is connected to the microcomputer 11 to convert the binary output signal indicative of the required amount of fuel into a pulse signal which is applied to the fuel injectors 1a to effectuate fuel injection. Thus conversion circuit 12 and injectors 1a provide means responsive to the microcomputer 11 output signal for controlling the amount of fuel injected in engine 1. It should be noted in FIG. 1. that the air flow sensor 5, the throttle sensor 6, the temperature sensor 7, the microcomputer 11 and the conversion circuit 12 which are kept operative electrically are supplied with the electric power from the battery through the key switch 9.

Figure 2:
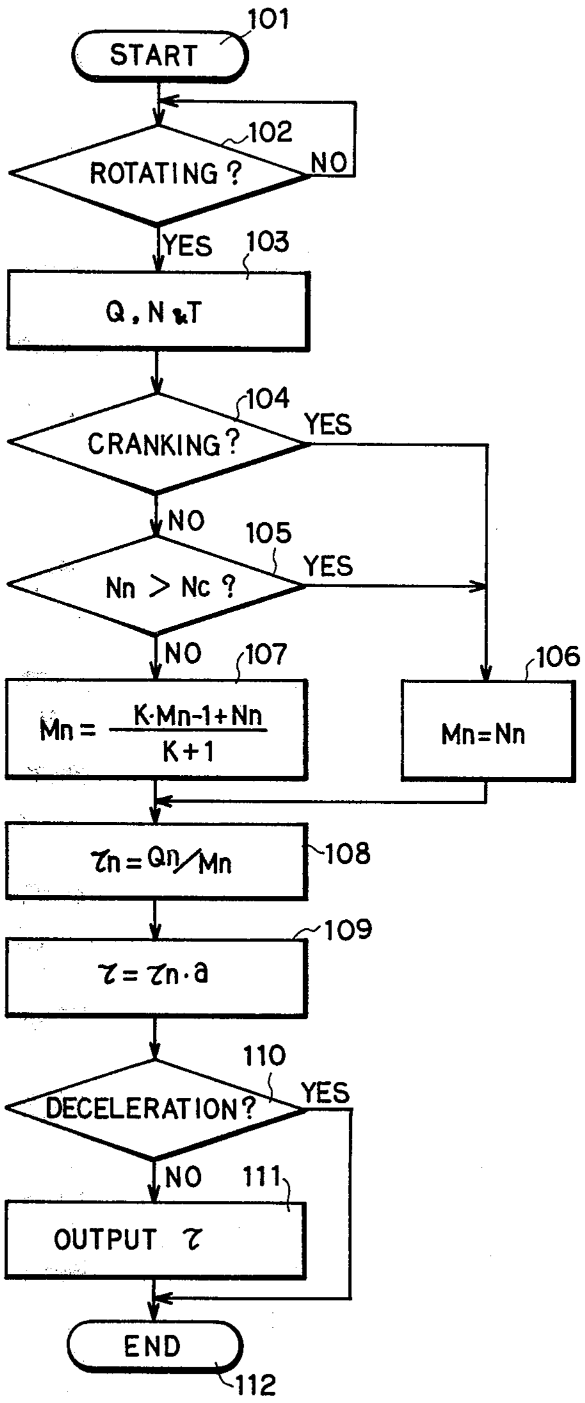
FIG. 2 is a flow chart illustrating a first embodiment of the control method performed by the apparatus shown in FIG. 1.

As the first embodiment of the electronic fuel injection control apparatus, the microcomputer 11 is programed to calculate the amount of fuel required by the engine 1 in such a sequence as illustrated in FIG. 2. The microcomputer 11 is rendered operative at a start step 101 when the supply of the electric power is started by the key switch 9. The microcomputer 11 discriminates at a discrimination step 102 as to whether the output shaft 1c is being rotated in view of the presence and the absence of the output signal of the breaker assembly 8b. When the discrimination result is NO indicating that the engine 1 is not in operation, the step 102 is repeated. When the discrimination result is YES indicating that the engine 1 is in operation, the microcomputer 11 measures at a measurement step 103 the amount of air Q indicated by the output signal of the sensor 5, the rotation speed N indicated by the output signal of the breaker assembly 8b and the coolant temperature T indicated by the output signal of the sensor 7. Measuring Q and T can be attained by analog-to-digital conversion, whereas measuring N can be attained by measuring the cycle period of the pulsated output signal. The microcomputer 11 then discriminates at a discrimination step 104 as to whether the engine 1 is being cranked by the starter circuit 10 in view of the output signal of the starter circuit 10. When the discrimination result is NO indicating that the engine 1 is not in cranking, the microcomputer 11 proceeds to a discrimination step 105 to discriminate as to whether the measured value Nn of the rotation speed N measured at the step 103 is larger than a constant value Nc. It should be noted herein that the constant value Nc is predetermined experimentally to indicate the limit of rotation speed below which potential of a surge is high. When one of the discrimination results at the steps 104 and 105 is YES indicating little potential of the surge, the microcomputer 11 proceeds to a set step 106 to set a variable Mn to the measured value Nn. When both of the discrimination results at the steps 104 and 105 are NO indicating high potential of the surge, the microcomputer 11 proceeds to a set step 107. It should be noted at the step 107 that the variable Mn is set to a value corrected based on a function having a predetermined delay factor relative to the measured value Nn of the rotation speed. The function used in the step 107 is defined as $(K \cdot M_{n-1} + Nn)/(K+1)$, where K indicates a constant and $M_{n-1}$ indicates the variable Mn which is set at the step 106 or 107 in the preceding calculation cycle of the microcomputer 11. Correcting the measured value Nn in this manner is useful for decreasing the change between the variables Mn and $M_{n-1}$. The variable Mn is set to an average value between Nn and $M_{n-1}$ provided that the constant K is equal to one. After the set step 106 or 107, the microcomputer 11 calculates the basic amount of fuel $\tau n$ at a basic calculation step 108. The basic calculation is defined as $\tau n = Qn/Mn$, where the measured value Qn of the amount of air Q and the variable Mn corresponding to the rotation speed N are used. After the step 108, the microcomputer 11 proceeds to a corrective calculation step 109 to calculate the required amount of fuel $\tau$. The corrective calculation is defined as $\tau = \tau n \cdot a$, where the coefficient a is dependent on the measured value Tn of the coolant temperature T. The microcomputer 11 then discriminates at a discrimination step 110 as to whether the engine 1 is decelerated. The deceleration is discriminated in view of the measured value Nn of the rotation speed and the output signal produced by the throttle sensor 6. When the discriminating result is NO indicating that the engine 1 is not decelerated, the microcomputer 11 provides the conversion circuit 12 with a binary signal corresponding to the required amount of fuel $\tau$ calculated in the corrective calculation step 109. When the discrimination result is YES indicating that the engine 1 is decelerated, the microcomputer 11 does not proceed to the step 111 but completes one calculating cycle at an end step 112. The above described calculating cycle is repeated in response to each of the pulsated output signal of the breaker assembly 8*b* which determines the ignition timing. The pulsated output signal which triggers the above calculating cycle may be frequency-divided to effectuate the fuel injection at every rotation of the output shaft 1*c*.

According to the first embodiment, the electronic fuel injection control for the engine 1 is attained in the following manner.

When the key switch 9 is turned to connect the sensors 5, 6 and 7, the ignition coil 8, the microcomputer 11 and the conversion circuit 12 with the battery, the microcomputer 11 is rendered operative. When the key switch 9 is further turned to connect the starter circuit 10, the output shaft 1*c* is rotated to crank the engine 1. During the engine cranking, the breaker assembly 8*b* operated by the output shaft 1*c* produces the output signal so that the ignition coil 8 generates the spark ignition voltage applied to the spark plugs 1*b* sequentially. The microcomputer 11 starts to calculate the required amount of fuel in response to the pulsated output signal of the breaker assembly 8*b*. With the output signal of the starter circuit 10 indicative of the cranking, the microcomputer 11 performs the steps 102, 103, 104, 106, 108, 109, 110 and 111 to provide the conversion circuit 12 with the binary signal indicative of the calculation result $\tau$. The conversion circuit 12 activates the fuel injectors 1*a* during the period of time proportional to the binary signal produced by the microcomputer 11. The conversion circuit 12 can be triggered at a timing when the binary signal or the pulsated output signal is produced. The fuel injected from the fuel injectors 1*a* is mixed with air to constitute air-fuel mixture which is combusted in the engine 1 to rotate the output shaft 1*c*. After the engine cranking, the engine 1 is subjected to the idling or the travelling of the automotive vehicle.

While the rotation speed N is lower than the predetermined speed Nc, the microcomputer 11 performs the steps 102, 103, 104, 105, 107, 108, 109, 110 and 111 to effectuate the fuel injection from the fuel injectors 1*a* through the conversion circuit 12. Since the amount of fuel $\tau$ is calculated using the measured value Nn of the rotation speed N currently measured in the measurement step 103 and the variable $M_{n-1}$ used in the preceding calculation cycle, the variable Mn becomes larger and smaller than the measured value Nn when the rotation speed is decreasing and increasing, respectively. Thus the change in the amount of fuel or the change in the air-fuel mixture ratio relative to the change in the rotation speed between two successive fuel injections is decreased to decrease the resultant change in the output torque of the engine. This is particularly advantageous when the automotive vehicle is accelerated from the low travelling speed in response to the acceleration of the engine 1. Provided that the accelerating force exerting on the automotive vehicle happens to be in timed relation with the increase in the output torque of the engine 1, the resonance between the automotive vehicle and the change in the output torque of the engine 1 does not become so large owing to the comparatively small increase in the output torque of the engine 1. Therefore, the surge of the automotive vehicle resulting from the above described resonance does not last long but is damped within a short period of time.

While the rotation speed N is higher than the predetermined speed Nc with no deceleration of the engine 1, the microcomputer 11 performs the steps 102, 103, 104, 105, 106, 108, 109, 110 and 111 sequentially to effectuate the fuel injection from the fuel injectors 1*a*. Since the amount of fuel $\tau$ is calculated using the measured value Nn of the rotation speed N currently measured, the amount of fuel $\tau$ supplied to the engine 1 can be speedily changed in response to the change in the rotation speed N of the engine 1.

Provided that the engine 1 is decelerated from the comparatively high rotation speed by the closure of the throttle valve 4 to decelerate the automotive vehicle, the microcomputer 11 performs the steps 102, 103, 104, 105, 106, 108, 109, and 110 but does not perform the step 111. As a result the conversion circuit 12 does not activate the fuel injectors 1*a* to prevent the fuel injection. Since the combustion of air-fuel mixture does not occur in the engine 1, the output torque and the rotation speed N of the engine 1 decreases responsively. When the rotation speed N is decreased below the predetermined speed Nc, the microcomputer 11 performs the steps 102, 103, 104, 105, 107, 108, 109 and 110 but does not perform the step 111. Therefore the fuel injection from the fuel injectors 1*a* is still prevented. With the throttle valve 4 being opened or the rotation speed N of the engine 1 decreasing excessively, the microcomputer 11 performs the step 111 in addition to the steps 102, 103, 104, 105, 107, 108, 109 and 110 to effectuate the fuel injection again. When the fuel injection from the fuel injectors 1*a* is resumed, the accelerating force resulting from the increase in the engine output torque exerts on the automotive vehicle. Provided that the accelerating force on the vehicle happens to be in timed relation with the increase in the output torque of the engine 1, the automotive vehicle is apt to make a resonance with the change in the output torque of the engine 1. However, since the amount of fuel $\tau$ required by the engine 1 is calculated using the measured value Nn of the rotational speed N currently measured and the variable $M_{n-1}$ used in the preceding calculation cycle, the change in the amount of fuel relative to the change in the rotation speed is decreased to result in a comparatively small change in the output torque of the engine. Therefore, the resonance does not become so large but is damped within a short period of time. This is advantageous for preventing the surge of the vehicle from occurring periodically.

Figure 3:
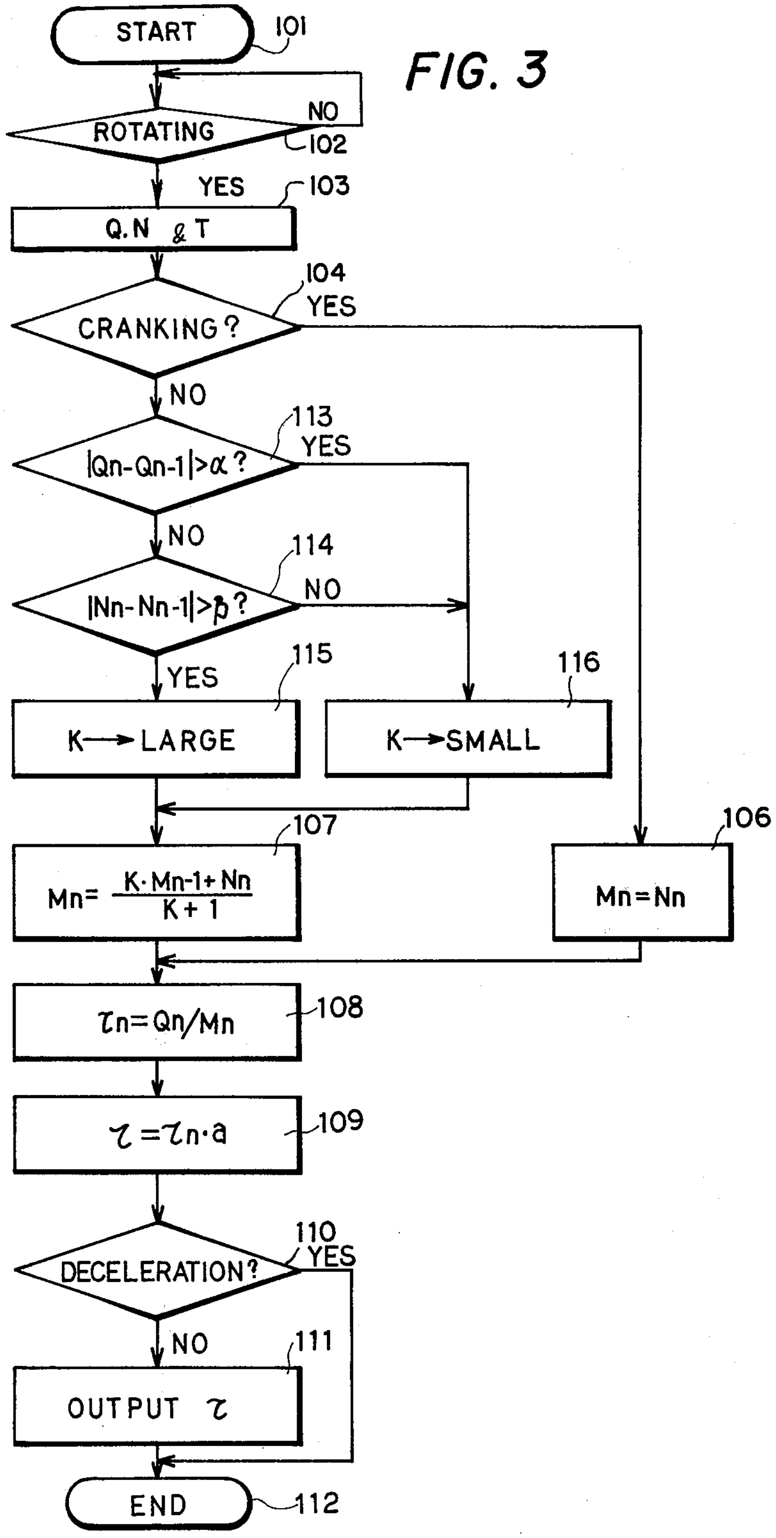
FIG. 3 is a flow chart illustrating a second embodiment of the control method performed by the apparatus shown in FIG. 1.

As the second embodiment of the electronic fuel injection control method, the microcomputer 11 is programed to calculate the required amount of fuel in such a sequence as illustrated in FIG. 3. It should be noticed that the second embodiment is different from the first embodiment by two discrimination steps 113 and 114 and two set steps 115 and 116 which are provided between the cranking discrimination step 104 and the set step 107. The discrimination steps 113 and 114 are provided from the fact that the amount of sucked air Q changes very little and the rotation speed N changes greatly upon occurrence of the surge of the vehicle. The microcomputer 11 discriminates at the discrimination step 113 after the cranking discrimination step 104 as to whether the change between the measured values Qn and Qn−1 measured in respective current and preceding calculation cycles is larger than a predetermined value $\alpha$. The microcomputer 11, with the discrimination result NO indicating that the change in the amounts of sucked air is small enough in the step 113, discriminates at the discrimination step 114 as to whether the change between the measured values Nn and $N_{n-1}$ measured in respective current and preceding calculation cycles is larger than a predetermined value $\beta$. When the discrimination result in the step 114 is YES indicating that the change in the two rotation speeds is large enough, the microcomputer 11 sets at the set step 115 the constant K to a large value so that the variable Mn used in the basic calculation step 108 is set closely to the variable $M_{n-1}$ used in the preceding calculation cycle. When the discrimination result in the step 113 is YES indicating that the change in the two amounts of sucked air is large or the discrimination result in the step 114 is NO indicating that the change in the two rotation speeds is small, the microcomputer 11 sets at the set step 116 the constant K to a small value so that the variable Mn is set closely to the measured value Nn.

The manner of the electronic fuel injection control according to the second embodiment seems to be understood with ease in view of the first embodiment. Therefore further detailed description with regard to the second embodiment is not made.

The electronic fuel injection control apparatus described hereinabove with reference to the first and second embodiments is not limited to a system in which the required amount of fuel is calculated using the amount of air sucked into the engine but applicable to other systems in which the required amount of fuel is calculated using the opening angle of the throttle valve or the intake pressure of the engine detectable as the intake parameter. Further, the function $(K \cdot M_{n-1}+Nn)/(K+1)$ having a predetermined delay factor relative to the currently measured value Nn of the rotation speed may be replaced by other functions which corrects the currently measured value Nn so that the change between the variables Mn and $M_{n-1}$ becomes smaller than the measured values Nn and $N_{n-1}$ of the rotation speed.

What I claim is:

1. An electronic fuel injection control system for an automotive vehicle driven by an internal combustion engine having an output shaft, said system being operative to reduce the resonance of said vehicle and comprising:

means for generating at every rotation of said output shaft an intake signal related to an intake parameter of said engine;

means for generating at every rotation of said output shaft a speed signal related to the rotational velocity of said output shaft;

controlling means responsive to said intake signal means and said speed signal means for generating an output signal related to the amount of fuel to be injected in said engine, said controlling means including:

means for monitoring the existence of operating conditions in said engine conducive to the amplification of resonance in said vehicle upon changes in the output torque of said engine, means responsive to said monitoring means for generating a control signal proportional to said speed during the absence of said conductive operating conditions and related to a modified speed signal during the presence of said conducive operating conditions, said modified speed signal being respectively smaller and greater than said speed signal as said speed signal increases and decreases, said modified speed signal thus being delayed with respect to said speed signal so that changes in said control signal are delayed during periods of said conducive operating conditions, and means for generating said output signal proportional to said intake signal and inversely proportional to said control signal at every rotation of said output shaft, changes in said output signal being thereby delayed during periods of said conducive operating conditions to avoid amplification of resonance in said vehicle upon changes in the output torque of said engine, thereby improving the smoothness of operation of said engine; and means responsive to the output signal of said controlling means for controlling the amount of fuel injected in said engine at every rotation of said output shaft.

2. An electronic fuel injection control system according to claim 1, wherein said intake signal generating means includes:

means for measuring the amount of intake air sucked into said engine, said amount of intake air being the intake parameter of said engine.

3. An electronic fuel injection control system according to claim 2, wherein said monitoring means includes:

means for comparing said speed signal with a predetermined speed value and generating an output when said speed signal is smaller than said predetermined speed value.

4. An electronic fuel injection control system according to claim 2, wherein said monitoring means includes:

means for comparing the difference between two measured intake values provided successively by said intake signal generating means in two rotations of said output shaft with a predetermined first value;

means for comparing the difference between two measured speed values provided successively by said speed signal generating means in two rotations of said output shaft with a predetermined second value; and means for producing an output when the difference between said two measured intake values is smaller than said predetermined first value and the difference between said two measured speed values is larger than said predetermined second value.

5. An electronic fuel injection control system according to claim 3 or 4, wherein said controlling means includes:

means for calculating said modified speed signal from said speed signal in the current rotation of said output shaft and at least one of said speed signal and said modified speed signal in the preceding rotation of said output shaft.

* * * * *